United States Patent [19]
Hayashi et al.

[11] Patent Number: 5,281,372
[45] Date of Patent: Jan. 25, 1994

[54] PROCESS FOR PRODUCING RESIN MOLDINGS HAVING A CONCAVE-CONVEX PATTERN ON THE SURFACE

[75] Inventors: Hisanori Hayashi, Kawasaki; Hirofumi Kamitakahara; Naoki Kushida, both of Yokohama; Hitoshi Yoshino, Kawasaki; Osamu Kanome, Yokohama; Tetsuya Sato, Kawasaki, all of Japan

[73] Assignee: Canon Kabushiki Kaisha, Tokyo, Japan

[21] Appl. No.: 857,441

[22] Filed: Mar. 25, 1992

[30] Foreign Application Priority Data

Mar. 26, 1991 [JP] Japan .................. 3-084542

[51] Int. Cl.⁵ ............................. B29C 39/42
[52] U.S. Cl. ........................ 264/1.3; 264/1.4; 264/2.5; 264/571; 264/102; 264/106; 264/220; 264/DIG. 78; 264/334; 425/810
[58] Field of Search ............ 264/1.1, 1.3, 1.4, 22, 264/40.5, 101, 102, 106, 107, DIG. 78, 334, 2.5, 220; 425/810

[56] References Cited
U.S. PATENT DOCUMENTS

| | | | |
|---|---|---|---|
| 2,985,928 | 5/1961 | Heskett | 264/DIG. 78 |
| 4,257,988 | 3/1981 | Matos et al. | 264/1.1 |
| 4,303,608 | 12/1981 | Ticker et al. | 264/101 |
| 4,342,714 | 8/1982 | Gregg et al. | 264/107 |
| 4,359,437 | 11/1982 | le Comte | 264/DIG. 78 |
| 4,477,328 | 10/1984 | Broeksema et al. | 264/107 |
| 4,482,511 | 11/1984 | Komatsubara | 425/810 |
| 5,048,745 | 9/1991 | Sato et al. | |

FOREIGN PATENT DOCUMENTS

| | | |
|---|---|---|
| 0308104 | 3/1989 | European Pat. Off. . |
| 0327192 | 8/1989 | European Pat. Off. . |
| 0409656 | 1/1991 | European Pat. Off. . |
| 58-187315 | 11/1983 | Japan . |
| 63-61135 | 3/1988 | Japan . |
| 63-213130 | 9/1988 | Japan . |
| 63-58698 | 11/1988 | Japan . |
| 3-53466 | 3/1991 | Japan . |
| WO87/02935 | 5/1987 | PCT Int'l Appl. . |

Primary Examiner—Jeffery Thurlow
Assistant Examiner—Mathieu Vargot
Attorney, Agent, or Firm—Fitzpatrick, Cella, Harper & Scinto

[57] ABSTRACT

A process for producing a resin molding having a concave-convex pattern on the surface includes the steps of providing an original die having a concave-convex pattern on the surface and a substrate having a flat surface, thereby counterposing the concave-convex pattern surface and the flat surface to each other through a spacer and forming a cell with a cavity formed by the original die, the substrate and the spacer; making an internal pressure of the cell cavity lower than an external pressure thereof, thereby filling at least one of a liquid polymerizable component and a liquid resin into the cavity due to a pressure difference between the external pressure and the internal pressure; curing at least one of the polymerizable component and the liquid resin in the cavity, thereby making a replica; and peeling the original die from the replica, thereby obtaining a resin molding.

31 Claims, 7 Drawing Sheets

PROCESS FOR PRODUCING RESIN MOLDINGS HAVING A CONCAVE-CONVEX PATTERN ON THE SURFACE

BACKGROUND OF THE INVENTION

Field of the Invention

The present invention relates to a process for producing a resin molding having a concave-convex pattern on the surface such as a substrate for optical recording media or an original stamper plate.

Related Background Art

A substrate for optical recording media has been so far produced typically by a compression method, a 2P molding method using a photo-curable resin, an extrusion molding method, etc., each using a stamper prepared by electroforming.

The stamper is generally prepared by forming a replica of an original die having a concave-convex pattern on the surface as an original stamper plate, forming an electroformed film on the original stamper plate and peeling the electroformed film from the original stamper plate.

A replicating die, i.e. the so called replica, is prepared from an original die by dispensing an uncured photocurable resin (which will be hereinafter referred to as 2P (photo polymer)) onto the surface of the original die, placing a glass or plastic substrate thereon, thereby spreading the 2P between the original die and the substrate, and then curing the 2P.

Figure 7A:
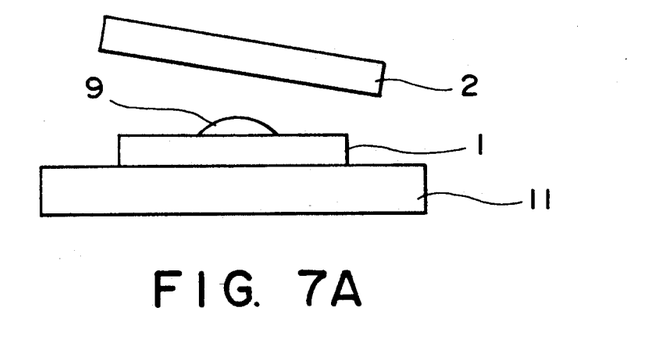
FIGS. 7A to 7C show steps for producing an original stamper plate by a conventional dispense-spread procedure.
Figure 7B:
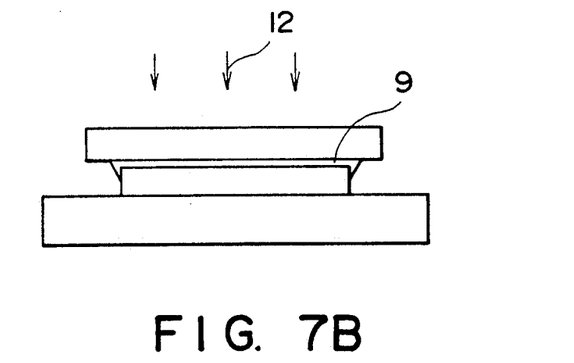
Figure 7C:
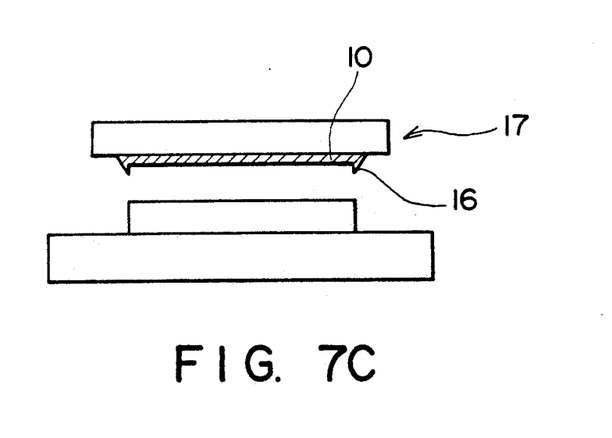

A conventional procedure for preparing an original stamper plate is shown in FIG. 7. At first, an original die 1 having a concave-convex pattern (not shown in the drawing) on the surface is fixed to a fixing plate 11, and a given amount of uncured 2P is dispensed on the surface of the original die 1 (FIG. 7A). Then, a glass substrate 2 is placed thereon to spread the 2P along the entire interface between the original die 1 and the glass substrate 2, and then the 2P is cured by irradiation with an ultraviolet beam 12 through the glass substrate 2 (FIG. 7B). Then, the cured 2P (10) is peeled off the original die 1 together with the glass substrate 2 to obtain a replica as an original stamper plate 17 (FIG. 7C).

The above-mentioned conventional procedure has such problems as inclusion of bubbles when the glass substrate 2 is placed on the uncured 2P on the original die 1 or when the uncured 2P is spread between the original die 1 and the glass substrate 2, and protrusions (flashes) of the uncured 2P from the edges of the original die 1 when excess uncured 2P is dispersed. As shown in FIG. 7C, protrusions 16 of cured 2P are formed at the replica edges and would be broken in the successive step, and the broken pieces of protrusions would attach to the pattern of the replica or to the edges of the original die to act as projections of the original die when the original die is used again for forming a replica.

It would be possible to apply a peeling agent to the edges of the original die and the glass substrate or using a masking agent to remove flashes of cured 2P by peeling, but the removed flashes have a high possibility to attach to the pattern surface of the replica or original die as a defect. Thus, this is not preferable.

To solve these problems, Japanese Patent Laid-Open Application No. 61-213130 proposes to spread uncured 2P in a vacuum to suppress the inclusion of bubbles and provide a leak-preventing wall for the uncured 2P at the outer peripheral edge to prevent protrusion of 2P. When the leak-preventing wall is provided, it is necessary to exactly control a supply amount of uncured 2P to be dispensed. When the supply amount is short, these would be such a case that 2P is not fully supplied to all the desired pattern regions. In case of excess supply 2P would go over the leak-preventing wall to form protrusions.

It is well known to prepare a substrate for optical recording media, particularly an optical disc substrate itself from a photocurable resin. In that case, there are also such problems as inclusion of bubbles into the photocurable resin and occurrence of defects or flashes due to the protrusion of uncured photocurable resin. For example, Japanese Patent Publication No. 63-58698 discloses a process for producing a substrate for optical recording media, which comprises applying an ultraviolet-curable resin circumferentially onto a transparent substrate, placing the transparent substrate in a turned-over state over a stamper with a clearance therebetween, letting the transparent substrate down onto the stamper while keeping the substrate and the stamper in an inclined state, and spreading the ultraviolet-curable resin along the interface therebetween by rolling, thereby preventing inclusion of bubbles in the ultraviolet-curable resin. However, the ultraviolet-curable resin-spread region cannot be exactly controlled even by the process. For example, when protrusion of the resin from the edges is to be prevented, a concave-convex pattern region cannot be provided at the edges of a stamper in order to securely supply the resin to the concave-convex pattern region on the stamper surface. This makes the process inefficient.

SUMMARY OF THE INVENTION

An object of the present invention is to overcome the problems of the prior art and to provide a process for producing a resin molding free from inclusion of bubbles and occurrence of defects and flashes due to protrusion of the resin.

Another object of the present invention is to provide a process for producing an original stamper plate, which can efficiently produce an original stamper plate without inclusion of bubbles and with a replica having a uniform thickness.

Anther object of the present invention is to provide an apparatus for producing a resin molding of uniform thickness without inclusion of bubbles.

The present invention provides a process for producing a resin molding, which comprises:

a) a step of providing an original die having a concave-convex pattern on the surface and a substrate having a flat surface, thereby counterposing the concave-convex pattern surface and the flat surface to each other through a spacer, thereby forming a cell with a cavity formed by the original die, the substrate and the spacer, b) a step of making an internal pressure of the cell cavity lower than an external pressure thereof, thereby filling at least one of a liquid polymerizable component and a liquid resin into the cavity due to a pressure difference between the external pressure and the internal pressure, c) a step of curing at least one of the polymerizable component and the liquid resin in the cavity, thereby making a replica, and d) a step of peeling the original die from the replica, thereby obtaining a resin molding.

The present invention further provides a process for producing an original stamper plate, which comprises:

a) a step of providing an original die having a concave-convex pattern on the surface and a substrate having a flat surface, thereby counterposing the concave-convex pattern surface and the flat surface to each other through a spacer, thereby forming a cell with a cavity formed by the original die, the substrate and the spacer, b) a step of making an internal pressure of the cell cavity lower than an external pressure thereof, thereby filling at least one of a liquid polymerizable component and a liquid resin into the cavity due to a pressure difference between the external pressure and the internal pressure, c) a step of curing at least one of the polymerizable component and the liquid resin in the cavity, thereby making a replica, and d) a step of peeling the original die from the replica, thereby obtaining an original stamper plate.

The present invention further provides an apparatus for producing a resin molding, which comprises a cell with a cavity formed by an original die having a concave-convex pattern on the surface, a substrate having a flat surface and a spacer, where the concave-convex pattern surface and the flat surface are counterposed to each other through the spacer; a means of reducing a pressure in the cavity; and a means of releasing a reduced pressure state in the cavity.

BRIEF DESCRIPTION OF THE DRAWINGS

FIGS. 1A and 1B show one example of a cell shape for use in the present process for producing an original stamper plate, where FIG. 1A is a plan view of a cell and FIG. 1B is a cross-sectional view along the line A—A of FIG. 1A.

FIGS. 2A and 2B show another example of a cell shape for use in the present process for producing an original stamper plate, where FIG. 2A is a plan view of a cell and FIG. 2B is a cross-sectional view along the line B—B of FIG. 2A.

DETAILED DESCRIPTION OF THE PREFERRED EMBODIMENTS

The present invention will be explained in detail below, referring to the drawings.

Figure 1A:
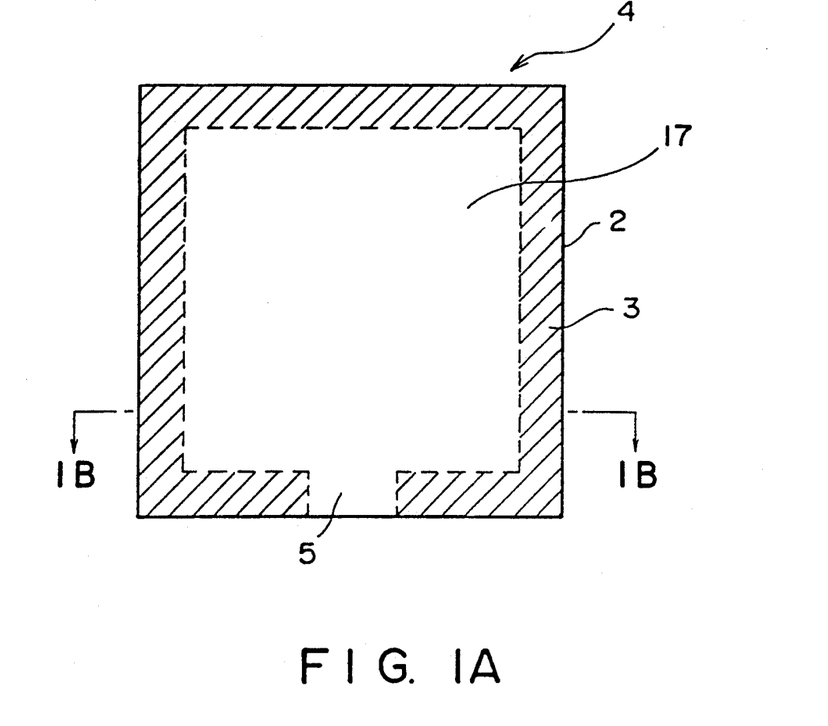
Figure 1B:
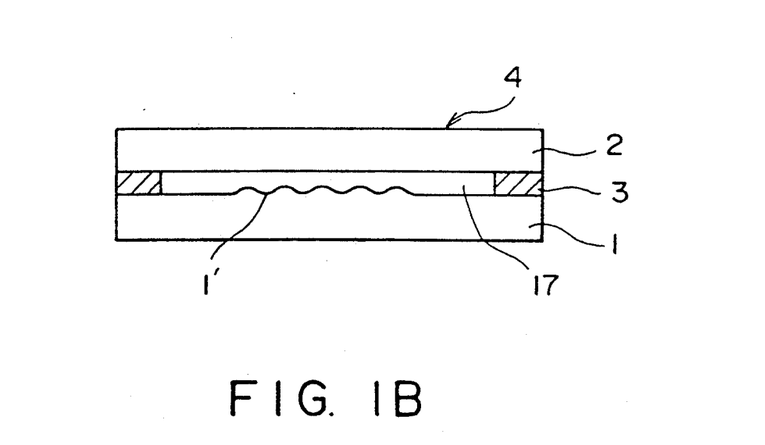

FIGS. 1A and 1B show one example of a cell shape for use in the present process for producing an original stamper plate, where FIG. 1A is a plan view of a cell and FIG. 1B is a cross-sectional view along the line 1B—1B of FIG. 1A.

As shown in FIGS. 1A and 1B, an original die 1 having a concave-convex pattern 1', such as pits, grooves, etc. on the surface and a glass substrate 2 having a flat surface are counterposed through a spacer 3 having a given thickness provided at the outer periphery so that the concave-convex pattern surface and the flat surface can face each other, and a cell 4 having a cavity 17 surrounded by the original die 1, the substrate 2 and the spacer 3 is formed thereby. An inlet 5 for filling uncured 2P into the cavity 17 is provided at a position of the outer periphery of the cell 4.

Figure 2A:
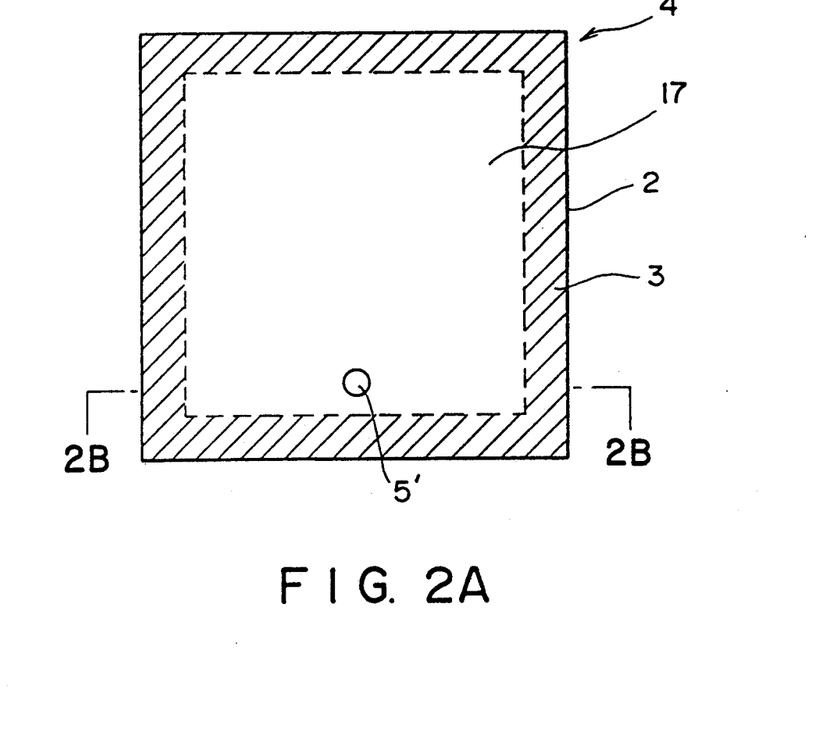
Figure 2B:
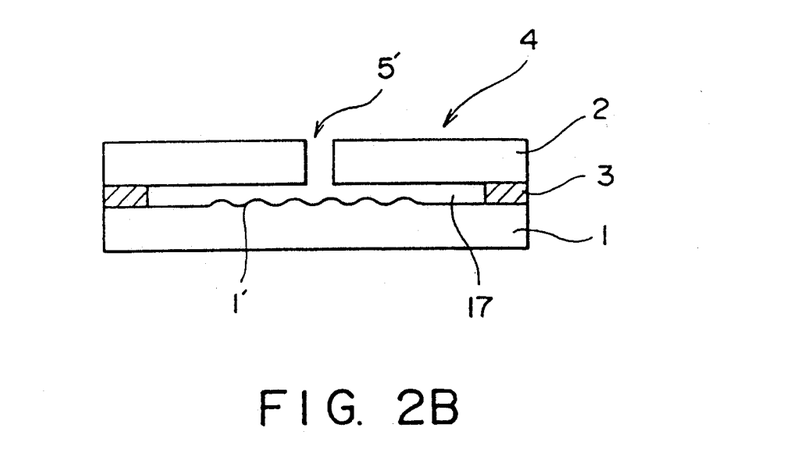

FIGS. 2A and 2B show another example of a cell shape for use in the present process for producing an original stamper plate, where FIG. 2A is a plan view of a cell and FIG. 2B is a cross-sectional view along the line 2B—2B of FIG. 1A.

As shown in FIGS. 2A and 2B, an inlet 5' is provided on a glass substrate 2 as an opening, through which uncured 2P may be filled into a cavity 17. The inlet 5' can be also provided on the original die 1, so long as the outlet 5' is positioned outside the effective area.

The present process for producing an original stamper plate, using the cell as described above, will be explained below.

Figure 3A:
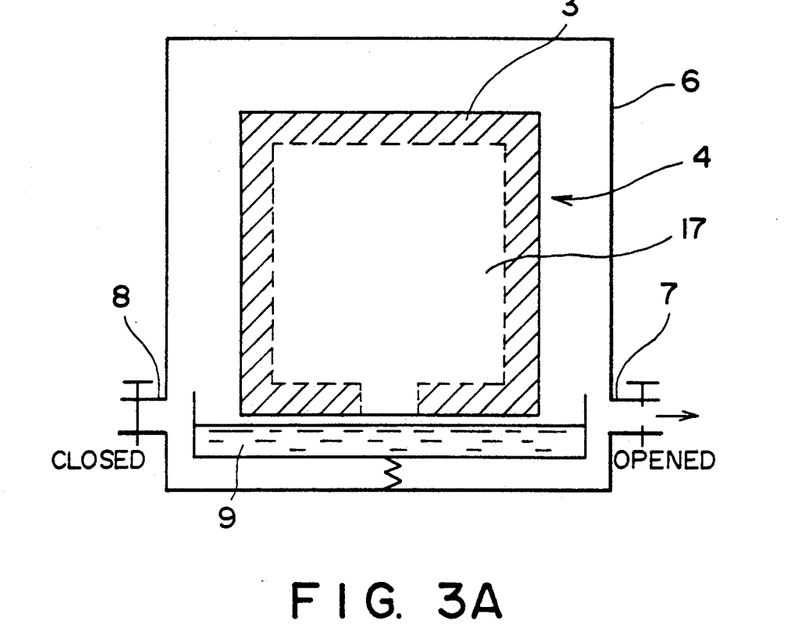
FIGS. 3A and 3B are views for explaining steps of filling uncured 2P into a cavity.
Figure 3B:
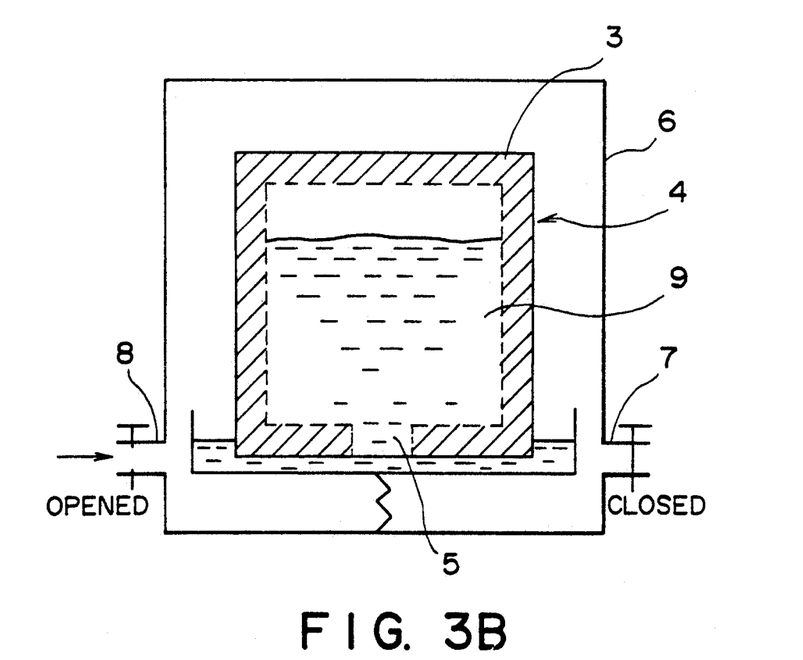

As shown in FIG. 3A, the cell 4 formed by the original die and the glass substrate and uncured 2P (9) are placed in a chamber 6, and air is evacuated from the chamber 6 through a vent 7 to keep the inside of the chamber 6 in a vacuum state. After deareation of uncured 2P (9) in the chamber 6 is completed, the vent 7 is closed and the inlet 5 of the cell 4 is dipped into the uncured 2P (9), as shown in FIG. 3B and air is leaked in from an air inlet 8. Through the foregoing operations, uncured 2P (9) is gradually introduced into the cell 4 due to a pressure difference between the cell 4 and the chamber 6. To promote the introduction of uncured 2P (9) into the cell 4, it is possible to make the pressure in the chamber 6 higher than the atmospheric pressure, that is, to pressurize the chamber 6.

In the present invention, it is preferable in the introduction of uncured 2P into the cavity 17 that the internal pressure of the cavity 17 is $1/10^2$ to $1/10^4$, particularly $1/10^2$ to $1/10^3$ of the external pressure. That is, when the internal pressure and the external pressure of the cavity 17 are set to have an above-mentioned relationship, uncured 2P (9) can be securely filled up to the ends of the cavity 17 without any large deformation of the cavity shape, and the rate of uncured 2P (9) to be introduced into the cavity 17 can be appropriately controlled.

When the pressure of the chamber 6 is made higher than the atmospheric pressure, as mentioned above, it is preferable to pressurize the chamber 6 so that a relationship between the internal pressure and the external pressure of the cavity 17 can be in the above-mentioned range.

In order to prevent inclusion of bubbles into 2P (9), it is preferable in the present invention that the cavity 17 has a vacuum degree of not more than 1 Torr, particularly not more than 0.1 Torr as an internal pressure.

Figure 4A:
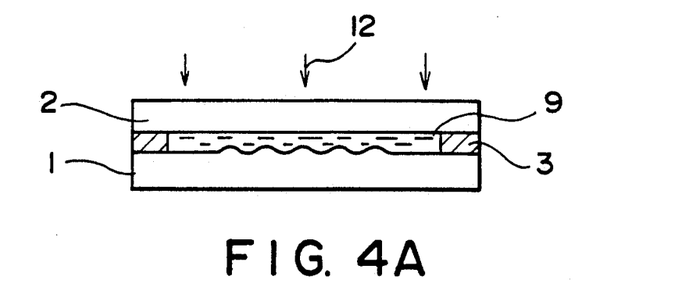
FIGS. 4A to 4D show one embodiment of steps from filling uncured 2P into a cavity as far as production of an original stamper plate.
Figure 4B:
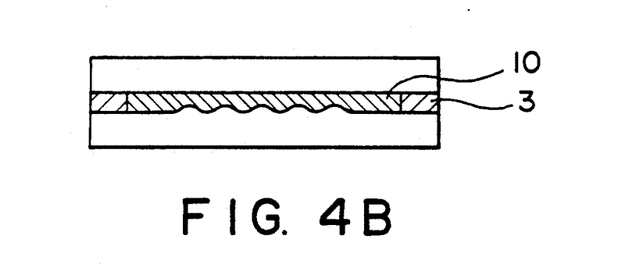
Figure 4C:
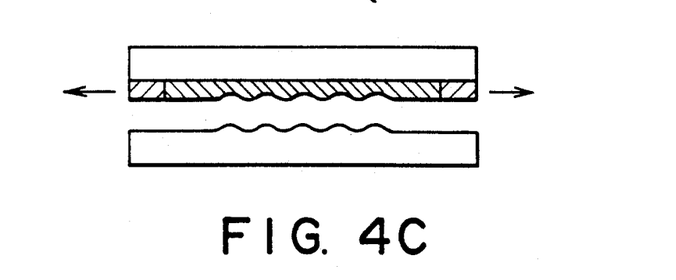
Figure 4D:
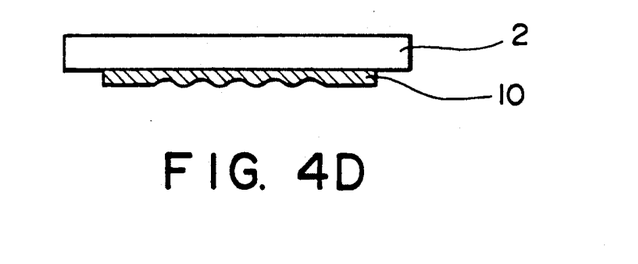

After the introduction of uncured 2P (9) into the cell 4 has been completed, the uncured 2P (9) in the cell 4 is irradiated with an ultraviolet (UV) beam to cure 2P, as shown in FIGS. 4A and 4B, and then the original die 1 is peeled off the glass substrate 2, whereby an original stamper plate comprising the glass plate 2 and a replical θ formed on the glass substrate 2 can be obtained (FIGS. 4C and 4D).

As explained above, uncured 2P is introduced into the cavity 17 due to a pressure difference between the internal pressure and the external pressure of the cavity 17 attained by evacuating the cavity 17 to bring the internal pressure into vacuum according to the present process for producing a replica, and thus no inclusion of bubbles takes place in a molding. In the present invention there is no such necessity for dispensing 2P, followed by lamination and spreading as in the prior art. Still furthermore, the resin can be securely filled up to the ends of the surface of the original die 1, and a concave-convex pattern can be formed even at the edge parts of the surface of the original die 1. That is, the original die can be fully utilized in the present invention.

In the present invention, only a spacer is provided at the outer periphery portion of the original die and thus a replica of any shape can be produced. In the preparation of substrates, it is advantageous from the viewpoint of efficiency and cost to produce a stamper as large as possible and obtain a number of substrates by one run. In the present invention, it is possible to produce a number of original stamper plates by one run.

Optical recording media include a circular shape and a rectangular shape such as a disc form and a card form, and particularly in case of a card, a rectangular stamper can produce a number of substrates by one run very efficiently.

In the present invention, the spacer 3 must have a function to make a cavity thickness of the cell 4, i.e., a gap constant, and a function to intercept air to form a pressure difference between the inside and the outside of the cell 4, i.e., a sealing function.

Materials for the spacer 3 are not particularly limited, so far as they can give the spacer a sealing function and a function to keep the cavity thickness uniform, but it is preferable to use a polymerizable component, which can be polymerized by light irradiation and/or by heating or polymerizable at ordinary temperature as spacer materials, because sealing of the original die 1 and the substrate 2 or formation of a spacer at the assembling of the cell 4 can be readily carried out by a dispersing procedure. For example, it is preferable to use polymerizable components including oligomers and/or monomers of acrylic, silicone, polyester, epoxy and urethane resins as a spacer material.

It is also possible to add a gap-forming agent to the spacer material to improve the uniformity of the thickness of the cavity 17. Such a gap-forming agent preferably has a predetermined outer diameter, and includes inorganic or organic fine particles such as alumina beads, zirconia beads, polystyrene beads, microballoons, etc. whiskers having a predetermined size can be also used.

When the gap-forming agent is used together with the spacer material, it is preferable from the viewpoint of dispersibility of the gap-forming agent and easiness of dispensing to use the above-mentioned polymerizable component, which can be polymerized by light irradiation and/or by heating, or polymerizable at ordinary temperature, as a spacer material. That is, a cell 4 can be formed with those polymerizable components as a spacer material by adding, if necessary, a gap-forming agent having a predetermined diameter to the polymerizable component such as an uncured oligomer and/or monomer, which is polymerizable by light irradiation and/or by heating; dispensing a given amount of the resulting mixture of the spacer material and the gap-forming agent onto the outer periphery of an original die 1 or a substrate 2; placing the original die 1 over the substrate 2 with such a clearance as to provide a given thickness to the cavity 17; and polymerizing the polymerizable component, thereby solidifying the polymerizable component.

As a spacer 3, a film molded to a predetermined thickness can be also used.

As a spacer film, a metallic film such as an aluminum foil or a plastic film can be used. It is preferable from the viewpoint of adhesiveness, i.e., sealability of the original die 1 and the glass substrate 2, to use a plastic film.

Applicable plastic films include films of, for example, polyethylene, polypropylene, polyvinyl alcohol, polyethylene terephthalate, polyacetyl cellulose, polyamide, polyimide, etc. By selecting an appropriate thickness of the plastic film, the gap degree of the cavity 17 can be controlled, and the desired sealability can be obtained thereby. As shown in FIG. 4D, the spacer 3 is ultimately removed, and a replica 10 is formed on the substrate 1. In case of using a film as the spacer 3, its removal is much simpler.

In the present invention it is preferable that the spacer is an elastomer having a hardness of not more than 80, particularly not more than 50 according to ASTM D 2240 (JIS K 6301). In the conventional curing of the uncured resin in the cavity, volumic shrinkage takes place when the liquid phase changes into a solid phase, and thus peeling of the cured resin from the outer periphery of the original die 1 due to the shrinkage in the thickness direction, that is, the so-called "floating" takes place, or a shrinkage in the in-plane direction of the cell 4, that is, the so-called "retraction" appears, resulting in uneven thickness of moldings or crack formation on the moldings. When the hardness of the spacer is limited to the above-mentioned range, occurrence of the "floating" or "retraction" can be reduced when the uncured prepolymer is cured. Such a preferable spacer material includes a polymerizable silicone rubber which is polymerizable by light irradiation and/or by heating.

In the present invention, it is very effective to use a gel-state elastomer having a penetration of 10 to 100, particularly 30 to 100, according to ASTM D 1321 as a spacer material. When a gel-state elastomer is used as a spacer material, as mentioned above, occurrence of "floating" or "retraction" of moldings can be well reduced and the cell can be prevented from a large deformation due to a flow when the inside of the cavity is brought into a negative pressure.

A good restoration to the predetermined cavity dimensions can be obtained by filling uncured 2P into the cavity of deformed cell due to the negative pressure prevailing in the cavity, and the thickness of moldings can be prevented from unevenness.

Materials for the gel-state elastomer include, for example, silicone rubbers, which turn to gel-state elastomers by light irradiation and/or by heating or by curing at ordinary temperature, such as YE 5822, YE 5818, TSE 3051 and TSE 3051L, (trademarks of products made by Toshiba Silicone K. K., Japan), which act as a spacer when applied to the surface of an original die or a substrate at the time of cell assembling and are readily missible with a gap-forming agent.

It is also effective to add fine hollow particles or microspheres capable of an compression deformation as a gap-forming agent to the spacer of elastomer. However, the gap-forming agent is not always necessary to use, and it is preferable to provide only the elastomer at the outer periphery.

The spacer composed only of elastomer can be effectively formed, for example, by providing a gap-forming agent at the outer periphery of an original die, dispensing a prepolymer of the elastomer at the inside of the gap-forming agent, placing a glass substrate on the original die to make a laminate, curing the polymerizable component of the elastomer at first, then introducing uncured 2P into the cavity, and removing the gap-forming agent therefrom before curing the 2P, whereby the spacer only of the elastomer can be made present at the curing of the 2P. In that case, a preferable gap-forming agent is a film from the viewpoint of easy removal.

As another procedure for preventing "floating" or "retraction", a heat-softening material is used as a spacer material, and the curing of 2P is carried out in a softened state of the spacer while maintaining the cell at a higher temperature than the softening temperature of the spacer 3, whereby "floating" or "retraction" can be prevented.

Heat-softening materials for use in the present invention include, for example, resins such as polyolefin resin, polyamide resin, polyester resin, polyurethane resin, polyacrylic resin, polyvinyl chloride resin, polyvinyl resin, petroleum resin, polystyrene resin, polyvinyl acetate resin, and cellulose resin; elastomers such as natural rubber, styrene-butadiene rubber, isoprene rubber and chloroprene rubber; and natural and synthetic waves such as spermaceti, beeswax, lanolin, carnauba wax, candelilla wax, montan wax, ceresine wax, paraffin wax, microcrystalline wax, oxidized wax, amide wax, ester wax, Fischer-Tropsch wax, stearyl alcohol, and sorbitan fatty, acid ester.

From the viewpoint of easy workability and easy handling, preferable softening temperature of the heat-softening material is usually 40° to 150° C., particularly 50° to 120° C.

Melt viscosity of the heat-softening material is preferably higher than that of uncured 2P to be used at a temperature by 10° C. higher than the softening temperature of the heat-softening material, and is usually 10 to $10^5$ cps, particularly 20 to $10^4$ cps. Below 10 cps, uncured 2P is liable to protrude, whereas above $10^5$ cps, peeling or retraction is liable to occur.

The above-mentioned resins, elastomers and waxes can be used alone as the spacer 3 or in an appropriate combination thereof as the heat-softening material to adjust the softening temperature or the melt viscosity. Above all, the waxes are preferable heat-softening materials because the viscosity of the waxes are abruptly lowered above the softening temperature and are easy to peel off the original die 1 after the curing of 2P and have a desired softening temperature and melt viscosity as mentioned above.

Figure 5A:
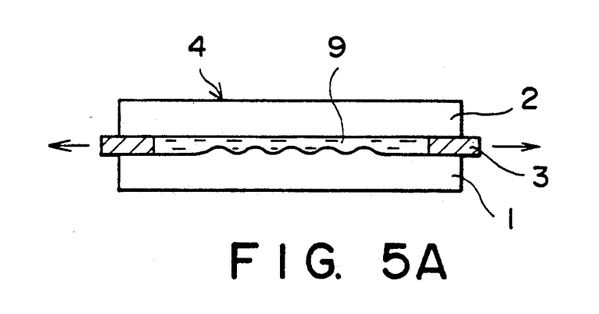
FIGS. 5A to 5C show another embodiment of steps from filling uncured 2P into a cavity as far as production of an original stamper plate.
Figure 5B:
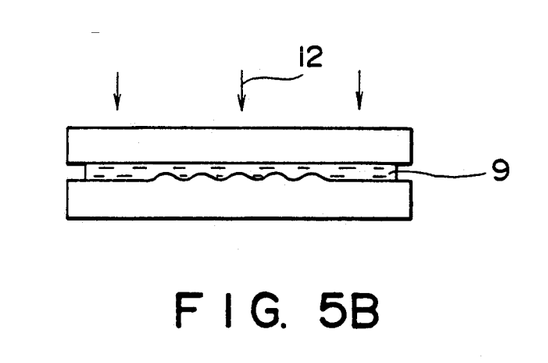
Figure 5C:
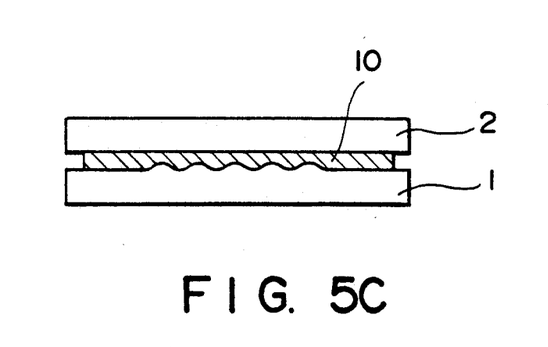

Even if the spacer is not made of an elastomer, spacer 3 is removed after the uncured 2P is introduced into the cavity but before the uncured 2P is cured, as shown in FIGS. 5A to 5C, and then the 2P is cured, whereby occurrence of "floating" or "retraction" can be prevented. When there is a fear of protrusion of uncured 2P to the outside of the cavity 17 due to the removal of the spacer 3 in that case, the entire cell is cooled to increase the viscosity of the uncured 2P thereby to prevent the protrusion of uncured 2P. It is simple and advantageous from the viewpoint of removal of the spacer before the curing of uncured 2P to use a film spacer.

The clearance of cavity 17 of the present cell 4 is set in accordance to the thickness of moldings to be produced, and is in a range of 5 to 500 $\mu$m, preferably 10 to 300 $\mu$m, more preferably 15 to 200 $\mu$m. When the thickness of the cavity 17 is less than 5 $\mu$m, the flatness of the original die and the substrate must be maintained with a higher exactness, and the original die and the substrate will be bent in the inward direction to the cavity 17 due to the introduction of uncured 2P into the cavity 17 by the pressure difference and may be brought into contact with each other at the center of the cavity 17, resulting in incomplete introduction of the prepolymer.

The present invention is not limited only to the production of original stamper plates, but is also applicable to the production of substrates for optical recording media such as optical cards or optical discs. In that case, the resin moldings themselves can serve as substrates for optical recording media. The substrates for optical recording media can be prepared by curing the prepolymer in the cavity and peeling the cured polymer from the original die and the substrate. As shown in FIG. 4D, the resin molding and the substrate may be integrated together to provide a substrate for otical recording media.

In the foregoing, uncured photocurable resin has been explained as materials to be filled in the cavity 17. In the present invention, any material can be used without any restriction, so far as it can be filled into the cavity as a liquid and then can be cured. For example, photopolymerizable monomers, heat-polymerizable oligomers and/or monomers, or prepolymers, or liquid polymers dissolved in a solvent, etc. can be used. Among these materials, those having a volume shrinkage of not more than 10%, particularly not more than 5%, more particularly not more than 3%, are preferable materials in the present invention.

When any one of the above-mentioned materials is filled as a liquid filled into the cavity 17, it is preferable that such a material has a viscosity of not more than $10^4$ cps, particularly not more than $10^2$ to $10^3$ cps according to JIS K 7117 when it is filled into the cavity 17. When the above-mentioned photopolymerizable monomers, heat-polymerizable oligomers and/or monomers or prepolymers are used, it is also very effective to use a spacer of the above-mentioned elastomer.

The size of the cavity for use in the present invention is as follows:

In case that the cavity plan shapes are rectangular including, a square, it is preferable to set the diagonal distance to not more than 800 mm, particularly not more than 750 mm. In case that the cavity plan shapes are circular, it is preferable to set the diameter to not more than 800 mm, particularly not more than 750 mm.

As explained above, a cell is formed from an original die and a glass substrate, placed one upon another through a spacer and at least one of polymerizable prepolymers, monomers and liquid resins is introduced into the cavity of the cell due to a pressure difference between the internal pressure and the external pressure of the cavity in the present invention, and thus inclusion of bubbles into the resin moldings can be prevented without formation of resin flashes. That is, resin moldings of good quality can be obtained according to the present invention.

Furthermore, any cavity shape can be selected and thus a replica of any shape can be prepared. Since the liquid polymeriable prepolymers and/or monomers or liquid resin can be securely filled up to the ends of the cavity 17, a concave-convex pattern can be formed on the entire surface of the original die and efficient resin molding can be carried out in the present invention. Still furthermore, good resin moldings with a uniform thickness and without any cracks, etc. can be obtained with a gel-state elastomer as a spacer for the cell 4.

The present invention will be explained in detail below, referring to Examples.

EXAMPLE 1

A 5 wt. % dispersion of microspheres having an average particle size of 40 μm (Expancel DU, trademark of a product made by Nihon Ferrite K. K., Japan) in photocurable resin (Hardlock OP4515, trademark of a product made by Denki Kagaku Kogyo K. K., Japan) was dispersed as a spacer at the outer periphery of a square original die, 300 mm×300 mm, with a pattern area, 250 mm×250 mm, by a dispenser, and then a glass substrate, 340 mm×340 mm, with an inlet was placed thereon, as shown in FIGS. 2A and 2B. The photocurable resin was irradiated with an ultraviolet beam to cure the resin, whereby a cell with an effective area of 270 mm×270 mm was obtained.

The pattern formed in the pattern area of the original die was a pattern corresponding to pregrooves for a stripe-shaped optical card, 3 μm wide, 12 μm for pitch and 3,000 Å deep.

Figure 6A:
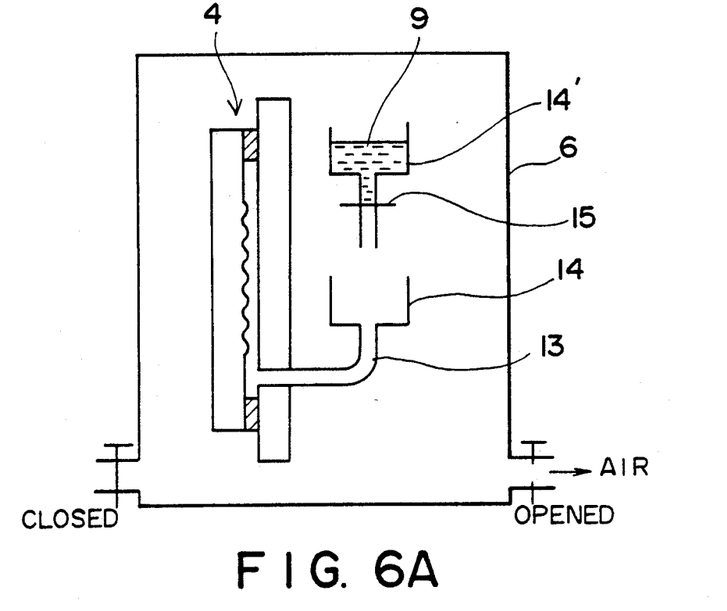
FIGS. 6A and 6B are views for explaining a procedure for filling uncured 2P into a cavity according to Example 1.
Figure 6B:
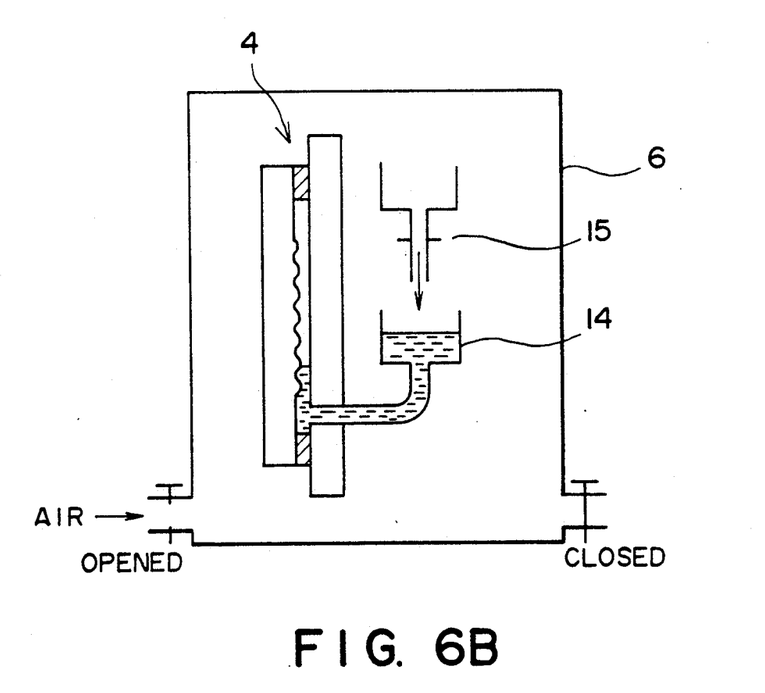

Then, a photo-curable resin (2P) was filled into the cavity 17 according to a procedure shown in FIGS. 6A and 6B. At first, as shown in FIG. 6A, the inlet 5 of the cell was connected to a funnel 14 through a Teflon ® tube 13 and then the cell was placed in a vacuum chamber. Another funnel 14' was provided to supply 2P (INC 118, trademark of a product made by Nihon Kayaku K. K., Japan) dropwise to the funnel 14, and the funnel 14' was made to open or close by an electromagnetic value 15 by manipulation from the outside of the vacuum chamber.

Then, the air of the vacuum chamber was evacuated to reduce the internal pressure of the cavity 17 to 0.1 Torr. The vacuum chamber was kept at that vacuum degree for 30 minutes to remove bubbles from the 2P. Then, as shown in FIG. 6B, the electromagnetic value 15 was opened to supply 2P into the funnel 14 dropwise and then air was gradually leaked into the chamber 6. 8 hours after the start of air leakage, the vacuum chamber was returned to the atmospheric pressure and 2P was fully introduced into the cell. It was observed by visual inspection that there were no bubbles in the cell.

In this Example, an acrylic ultraviolet-curable resin having a viscosity of 700 cps in the uncured state and a volume shrinkage of 3% after curing was used as 2P.

Then, the Teflon tube was removed from the inlet of the cell and the cell was irradiated with an ultraviolet beam from the glass substrate side to cure the 2P. It was found by visual inspection that floatings of maximum width of 10 mm occured without any retraction. Then, the original die and the glass substrate were parted off, whereby an original stamper plate for an optical card provided with a replica, 250 mm×250 mm, of an exactly transferred concave-convex pattern of the original die on the glass substrate was obtained.

EXAMPLE 2

A cell was formed in the same manner as in Example 1 except that a polyethylene terephthalate film having a thickness of 50 μm was used as the spacer. After the spacer-inserted part was thoroughly clamped for sealing, 2P was introduced into the cell and subjected to photocuring in the same manner as in Example 1. No bubbles were observed in the cell. After the photocuring, floatings occurred at the spacer periphery, but no retraction was observed. By peeling the original die off, an original stamper plate for an optical card, provided with a replica, 250 mm×250 mm and 50 μm thick, of an exactly transferred concave-convex pattern of the original die on the glass substrate was obtained.

EXAMPLE 3

A polyethylene terephthalate (PET) film, 5 mm wide and 50 μm thick, was provided at the outer periphery of the same original die as used in Example 1, and then a liquid ultraviolet-curable silicone rubber (TFC 7870, trademark of a product made by Toshiba Silicone K. K., Japan) was dispensed at the inside of the film, and then a glass substrate having a mirror-polished surface was placed thereon so that the mirror-polished surface can face the patterned surface of the original die. Then, the silicone rubber was cured by irradiation with an ultraviolet beam to make a spacer having a hardness of 25 according to ASTM D 2240 and setting the gap degree of the cavity 17 to 50 μm.

Then, the PET film that sets the gap degree of the cavity was removed to form a cell sealed with the silicone rubber with a gap degree of cavity of 50 μm and a cell effective area of 270 mm×270 mm.

2P was introduced into the cell, and subjected to photocuring and peeling in the same manner as in Example 1. No bubbles were observed in the filled cell and no substantial floatings were observed at the periphery of silicone rubber after the photocuring. By peeling the original die off, an original stamper plate for an optical card, provided with a replica, 250 mm×250 mm, of an exactly transferred concave-convex pattern of the original die on the glass substrate was obtained.

EXAMPLE 4

A cell was prepared in the same manner as in Example 3, except that ultraviolet-curable silicone rubber having a hardness of 17 after the curing according to ASTM D 2240 (XE-303, trademark of a product made by Toshiba Silicone K. K., Japan) was used in place of the ultraviolet-curable silicone rubber of Example 3, and a replica was molded from the cell in the same manner as in Example 3. No inclusion of bubbles in the replica was observed and no substantial floatings were observed at the periphery of the spacer. By peeling the original die off, an original stamper plate for an optical card, provided with a replica, 250 mm×250 mm and 50 μm thick, of an exactly transferred concave-convex pattern of the original die on the glass substrate was obtained.

EXAMPLE 5

A cell was prepared in the same manner as in Example 3 except that an original die with an enlarged pattern area of 270 mm×270 mm of Example 1 was used and gel-state ultraviolet-curable silicone having a penetration of 80 after the curing (XE.17-A0884, trademark of a product made by Toshiba Silicone K. K., Japan) was used as a spacer in place of the ultraviolet-curable silicone rubber of Example 3.

A replica was molded from the cell in the same manner as in Example 3. The PET film that sets the gap degree was removed before 2P was introduced into the cavity. After filling of uncured 2P into the cavity, 2P was cured by irradiation with an ultraviolet beam. No floating from the original die was observed at all. The effective area of the replica after the peeling was 270 mm×270 mm, which was equal to the cell effective area and the thickness of the replica was uniformly 50 μm throughout the entire surface.

EXAMPLE 6

A cell was prepared in the same manner as in Example 5 except that gel-state ultraviolet-curable liquid silicone having a penetration of 85 after the curing (TUV 6001, trademark of a product made by Toshiba Silicone K. K., Japan) was used in place of the gel-state ultraviolet-curable liquid silicone of Example 5. A replica was molded from the cell and no occurrence of "floatings" and "retraction" was observed at all. By peeling the original die off, a replica of an exactly transferred concave-convex pattern of the original die and uniform thickness over the entire surface of 270 mm×270 mm was obtained.

EXAMPLE 7

A cell was prepared in the same manner as in Example 2, except that a polyolefin film sheet (X-1430, trademark of a product made by Daicel K. K., Japan) having a thickness 50 μm was used in place of the spacer of Example 2, and the original die and the glass substrate were pressed to each other in a dry oven at 100° C.

Then, 2P was introduced into the cavity and the 2P-filled cell was irradiated with an ultraviolet beam while maintaining the cell at 120° C. to cure the 2P.

After the curing, some floating from the original die was observed near the spacer, and a replica, 260 mm×260 mm, without inclusion of bubbles was obtained.

EXAMPLE 8

A PET film, 5 mm wide and 50 μm thick, was provided at the periphery of the same original die as used in Example 1, and paraffin wax having a melting point of 155° F. (68.3° C.), made by Nihon Seiro K. K., Japan, was dispensed in a heated and molten state at the inside of the film, and a glass substrate was placed thereon. After the paraffin wax was solidified, the PET film was removed therefrom to form a cell, 270 mm×270 mm.

Then, 2P was introduced into the cavity and the cell was irradiated with an ultraviolet beam while maintaining the entire cell at 80° C. to cure the 2P. Even after cooling to room temperature, no floating of cured 2P from the original die was observed at all. By peeling the original die, a replica, 270 mm×270 mm, without inclusion of bubbles was obtained. The paraffin wax had a melt index (78.3° C.) of not more than 100 cps.

EXAMPLE 9

A replica was molded in the same manner as in Example 8 except that lanolin wax (Lanox FP-1406N, trademark of a product made by Yoshikawa Seiyu K. K., Japan) was used in place of the paraffin wax of Example 8. After curing of 2P, a replica, 270 mm×270 mm, without occurrence of floating and inclusion of bubbles was obtained. The lanolin wax had a melt index (80° C.) of not more than 200 cps.

What is claimed is:

1. A process for producing a resin molding having a concave-convex pattern on the surface, which comprises the steps of:
   a) providing an original die having a concave-convex pattern on the surface and a substrate having a flat surface and a substrate having a flat surface, counterposing the concave-convex pattern surface and the flat surface to each other through a spacer, thereby forming a cell with a cavity formed by the original die, the substrate and the spacer;
   b) preparing a chamber having means for regulating internal pressure of the cavity;
   c) disposing within the chamber the cell and at least one of an uncured liquid polymerizable component and an uncured liquid resin to be injected in the cell and thereafter reducing the internal pressure in the chamber;
   d) stopping an inlet of the cell with at least one of the uncured liquid polymerizable component and the uncured liquid resin;
   e) releasing the internal pressure in the chamber after stopping the inlet and filling at least one of the liquid polymerizable component and the liquid resin into the cavity;
   f) curing at least one of the polymerizable component and the liquid resin in the cavity to prepare a replica; and
   g) peeling the replica from the original die to obtain a resin molding.

2. A process according to claim 1, wherein the internal pressure of the cavity is reduced to $1/10^2$ to $1/10^4$ of the external pressure.

3. A process according to claim 2, wherein the internal pressure of the cavity is reduced to $1/10^2$ to $1/10^3$ of the external pressure.

4. A process according to claim 1, wherein the internal pressure of the cavity is not more than 1 Torr.

5. A process according to claim 4, wherein the internal pressure of the cavity is not more than 0.1 Torr.

6. A process according to claim 1, wherein at least one of the liquid polymerizable component and the liquid resin to be filled in the cavity has a viscosity of not more than $10^4$ cps.

7. A process according to claim 6, wherein at least one of the liquid polymerizable component and the liquid resin has a viscosity of $10^2$ to $10^3$ cps.

8. A process according to claim 6, wherein the liquid polymerizable component is an uncured photocurable resin.

9. A process according to claim 1, wherein at least one of the liquid polymerizable component and the liquid resin has a volume shrinkage of not more than 10% after curing.

10. A process according to claim 1, further comprising the step of using a material containing a liquid polymerizable component as a spacer material, applying uncured spacer material to the surface of at least one of the original die and the substrate, then placing the original die and the substrate one upon another and curing the spacer material, thereby forming a cell with the cured spacer material as the spacer.

11. A process according to claim 1, wherein an elastomer is used as the spacer for the cell.

12. A process according to claim 11, wherein the elastomer has a hardness of not more than 80.

13. A process according to claim 12, wherein the elastomer has a hardness of not more than 50.

14. A process according to claim 11, wherein the elastomer is a cured product of a material containing a liquid polymerizable component.

15. A process according to claim 11, wherein the elastomer is a silicone rubber.

16. A process according to claim 1, wherein a gel-state elastomer is used as the spacer for the cell.

17. A process according to claim 16, wherein the gel-state elastomer has a penetration of 10 to 100.

18. A process according to claim 17, wherein the gel-state elastomer has a penetration of 30 to 100.

19. A process according to claim 16, wherein the gel-state elastomer is a cured product of a material containing a liquid polymerizable component.

20. A process according to claim 16, wherein the gel-state elastomer is a silicone rubber.

21. A process according to claim 1, further comprising the step of using a heat-softening material as the spacer, filling the cavity of the cell with at least one of the liquid polymerizable component and the liquid resin and curing at least one of the polymerizable component and the liquid resin in the cavity in a softened state of the spacer attained by heating the spacer to a temperature higher than the softening temperature of the spacer.

22. A process according to claim 21, wherein the heat-softening material is a material having a lower viscosity, at a temperature by 10° C. higher than the softening temperature of the material, than the viscosity of at least one of the liquid polymerizable component and the liquid resin.

23. A process according to claim 21, wherein the heat-softening material is wax.

24. A process according to claim 1, further including the step of removing the spacer after filling the cavity with at least one of the liquid polymerizable component and the liquid resin and then curing at least one of the liquid polymerizable component and the liquid resin in the cavity.

25. A process according to claim 1, wherein the spacer is a resin film.

26. A process according to claim 1, wherein the resin molding having a concave-convex pattern is a substrate for optical recording media.

27. A process for producing an original stamper plate, which comprises the steps of:
  a) providing an original die having a concave-convex pattern on the surface and a substrate having a flat surface, counterposing the concave-convex pattern surface and the flat surface to each other through a spacer, thereby forming a cell with a cavity formed by the original die, the substrate and the spacer;
  b) preparing a chamber having means for regulating internal pressure of the cavity;
  c) disposing within the chamber the cell and at least one of an uncured liquid polymerizable component and an uncured liquid resin to be injected in the cavity of the cell and thereafter reducing the internal pressure in the chamber;
  d) stopping an inlet of the cell with at least one of the uncured liquid polymerizable component and the uncured liquid resin;
  e) releasing the internal pressure in the chamber after stopping the inlet and filling at least one of the liquid polymerizable component and the liquid resin into the cavity;
  f) curing at least one of the polymerizable component and the liquid resin in the cavity to after releasing the reduced pressure to prepare a replica; and
  g) peeling the replica from the original die to obtain an original stamper plate.

28. A process for producing a resin molding having a concave-convex pattern on its surface, which comprises the steps of:
  a) providing a cell with a cavity having a concave-convex pattern on its inner surface and an inlet for filling at least one of an uncured liquid polymerizable component and an uncured liquid resin into the cavity;
  b) providing a chamber having pressure regulating means for regulating internal pressure of the chamber;
  c) disposing within the chamber the cell and at least one of an uncured liquid polymerizable component and the uncured liquid resin to be injected in the cavity of the cell and thereafter reducing the internal pressure in the chamber;
  d) stopping an inlet of the cell with at least one of the uncured liquid polymerizable component and the uncured liquid resin;
  e) releasing the state of reduced pressure in the chamber after stopping the inlet and filling at least one of the liquid polymerizable component and the liquid resin into the cavity;
  f) curing at least one of the liquid polymerizable component and the liquid resin in the cavity after releasing the reduced pressure to prepare a replica; and
  g) taking the replica out of the cavity to obtain a resin molding.

29. A process for producing an original stamper plate, which comprises the steps of:
  a) providing a cell with a cavity having a concave-convex pattern on its internal surface and an inlet for filling a liquid into the cavity;
  b) preparing a chamber having means for regulating internal pressure of the cavity;
  c) disposing within the chamber the cell and at least one of an uncured liquid polymerizable component and an uncured liquid resin to be injected into the cavity of the cell and thereafter reducing the internal pressure in the chamber;
  d) stopping an inlet of the cell with at least one of the uncured liquid polymerizable component and the uncured liquid resin;
  e) releasing the state of reduced pressure in the chamber after stopping the inlet and filling at least one of the liquid polymerizable component and the liquid resin into the cavity;
  f) curing at least one of the liquid polymerizable component and the liquid resin in the cavity after releasing the reduced pressure to prepare a replica; and
  g) taking the replica out of the cavity to obtain an original stamper plate.

30. A process according to claim 29, wherein the concave-convex pattern is a pattern corresponding to a pregroove for an optical recording medium.

31. A process according to claim 29, wherein the plate is an original stamper plate for producing a stamper for molding an optical recording medium.

* * * * *

UNITED STATES PATENT AND TRADEMARK OFFICE
CERTIFICATE OF CORRECTION

PATENT NO. : 5,281,372
DATED : January 25, 1994
INVENTOR(S) : Hayashi et al.

It is certified that error appears in the above-indentified patent and that said Letters Patent is hereby corrected as shown below:

COLUMN 2:

Line 5, "these" should read --there--.

COLUMN 3:

Line 38, "A-A" should read --1B-1B--.
Line 43, "line B-B" should read --line 2B-2B--.

COLUMN 4:

Line 16, "FIG. 1A." should read --FIG. 2A.--.
Line 29, "deareation" should read --deaeration--.
Lines 66 and 67, "replical $\theta$" should read --replica $\theta$--.

COLUMN 6:

Line 62, "missible" should read --miscible--.

COLUMN 8:

Line 64, "polymeriable" should read --polymerizable--.

COLUMN 9:

Line 34, "value 15" should read --valve 15--.
Line 40, "value" should read --valve--.

COLUMN 11:

Line 67, "surface and a substrate having a flat" should be deleted.

UNITED STATES PATENT AND TRADEMARK OFFICE
CERTIFICATE OF CORRECTION

PATENT NO. : 5,281,372
DATED : January 25, 1994
INVENTOR(S) : Hayashi et al.

It is certified that error appears in the above-indentified patent and that said Letters Patent is hereby corrected as shown below:

COLUMN 12:

Line 48, "according," should read --according--.

COLUMN 13:

Line 43, "surface" (first occurrence) should be deleted.

COLUMN 14:

Line 16, "in" should read --into--.

Signed and Sealed this

Twenty-seventh Day of September, 1994

Attest:

BRUCE LEHMAN

Attesting Officer    Commissioner of Patents and Trademarks